United States Patent [19]

Lefkowitz

[11] Patent Number: 4,874,407
[45] Date of Patent: Oct. 17, 1989

[54] REGENERABLE FILTER

[76] Inventor: Leonard R. Lefkowitz, 14 Alpine Dr., Latham, N.Y. 12110

[21] Appl. No.: 306,911

[22] Filed: Feb. 7, 1989

[51] Int. Cl.⁴ ............................................ B01D 46/04
[52] U.S. Cl. ........................................ 55/213; 55/215;
  55/269; 55/272; 55/283; 55/290; 55/295;
  55/502; 55/523; 55/DIG. 30; 60/303; 60/311
[58] Field of Search ................. 55/213, 215, 272, 283,
  55/290, 295, 296, 297, 502, 503, 523, 269, DIG.
  30; 60/303, 311; 210/402, 407, 408, 413

[56] References Cited

U.S. PATENT DOCUMENTS

| | | | |
|---|---|---|---|
| 3,367,506 | 2/1968 | Rosaen | 210/408 |
| 4,162,148 | 7/1979 | Furstenberg | 55/272 |
| 4,276,066 | 6/1981 | Bly et al. | 60/311 X |
| 4,386,497 | 6/1983 | Takagi et al. | 60/311 X |
| 4,406,119 | 9/1983 | Kamiya et al. | 60/275 |
| 4,473,384 | 9/1984 | Lefkowitz | 55/290 |
| 4,481,767 | 11/1984 | Stark | 60/303 |
| 4,516,990 | 5/1985 | Ermannsdorfer et al. | 55/523 X |
| 4,630,438 | 12/1986 | Shinzawa | 55/283 X |
| 4,732,594 | 3/1988 | Mizrah et al. | 55/523 |

FOREIGN PATENT DOCUMENTS 2181968 5/1987 United Kingdom .

Primary Examiner—Charles Hart
Attorney, Agent, or Firm—Witherspoon & Hargest

[57] ABSTRACT

A regenerable filter for use with exhaust gas streams containing combustible particles, the filter including a filter medium upon which the particles build up as the filter medium removes the particles from the gas stream, a scraper to remove the particles, except for a precoat, from the filter medium, and a burner to burn the removed particles outside the main exhaust gas exit.

16 Claims, 3 Drawing Sheets

REGENERABLE FILTER

BACKGROUND OF THE INVENTION

1. Field of the Invention

The present invention relates to the separation and oxidation of combustible particulate residues contained in exhaust gas streams from diesel engines, as well as from other internal combustion engines, incinerators, oil or coal fired industrial or utility broilers, and other such operations.

2. Description of the Prior Art

Although this invention has broad application in many gas cleaning operations where combustible materials make up the principle particulate contaminant, by way of example, this discussion will center upon the mobile diesel engine emission application.

Increasing concern about the environment has led to tightened emissions standards for heavy duty diesel engines used in trucks and buses.

Industry has responded with a wide range of devices intended to reduce noxious fumes and particulate emissions. Efforts have concentrated on various means of removing particulates from the exhaust gas and burning the collected soot in devices called trap oxidizers.

Various forms of particulate traps have been tried including the ceramic honeycomb monolith wall flow trap.

Ceramic monolith traps consist of a honeycomb of long channels with porous walls. The open channels of the honeycomb are alternately blocked with cement at the ends so that all the exhaust flow entering the open channels must pass through the porous ceramic walls before exiting the trap.

In most cases, particulate matter is collected in a filter or trap until a substantial residue has been accumulated. All during this accumulation phase, there is a steady build up in back pressure which reduces engine output power and fuel economy. In order to keep back pressure within acceptable bounds, the trap must be periodically regenerated.

Attempts to regenerate the trap continuously on stream have proven extremely costly in terms of the energy that must be expended to constantly maintain the exhaust gas at the soot ignition temperature.

In the usual case, particulate matter is collected on a filter over some period of time varying from less than one hour to several hours. All during this time, back pressure is allowed to build up until it reaches substantial levels before regeneration is initiated. There are at least two reasons for allowing this build up to take place on the filter. The first is that the regeneration step requires energy to raise exhaust gas temperature. Therefore, by waiting longer between regenerating cycles, some energy may be saved. And second, it is desired that the filter be completely cleaned at each regeneration. By allowing the filter to fill almost completely before regeneration is initiated, it has been found that combustion can be sustained until nearly all of the accumulated soot is burned off. Thus, the buildup in back pressure during the trap fillup phase appears to be prerequisite for periodic trap regeneration according to present practice.

Regeneration is achieved by raising the collected soot temperature to above its ignition temperature and maintaining a sufficient oxygen concentration in the gas stream to oxidize the soot particles once ignition begins.

There are two known ways that ignition temperatures can be attained. The first is by engine adjustment, such as throttling the engine at cruising speed. The second is by activating some external heat source such as a gas burner or an electric resistance heater situated directly in front of the trap.

Some success has been achieved in reducing the temperature needed for combustion by adding a catalyst either to the fuel, so that it ends up on the particles themselves, or by coating the trap matrix material with catalyst directly. There have been numerous attempts to make catalyzed trap oxidizers self regenerating so that there is no need for an external heat source or engine adjustment, but to date, these efforts have not been entirely successful. A further problem is that the collected soot has a high energy content which is released when it is burned. Caution must be exercised to insure that trap matrix temperatures as well as localized thermal gradients do not exceed safe operating limits for the trap may fail due to melting or cracking.

Regardless of which method of periodic regeneration is used, storing collected soot for periodic combustion results in a number of very serious problems:

1. Increasing back pressure between regenerations results in reduced useful engine power output.

2. Special engine throttling procedures are needed to provide high temperatures for combustion, and such procedures involve high energy costs. Alternatively, auxiliary energy consuming heating means must be activated to raise the temperature of the exhaust gas whenever regeneration is needed.

3. Another very formidable problem with the periodic regeneration approach is caused by the concentrated heat energy liberated when the stored up soot is finally burned. The soot tends to burn away in a moving fire front not unlike that of a burning cigarette. As each sequential position on the filter ignites, more heat is liberated, causing intense localized hot spots in the filter. Such momentary excursions, if beyond thermal stress tolerances, can cause even ceramic traps to melt or crack, rendering them useless as filters.

4. Diesel fuel and engine oil contain small amounts of noncombustible ash, usually in the form of metallic compounds. This unburned residue remains in the trap after each regeneration cycle, slowly building up and eventually plugging the filter.

Despite intensive efforts, progress has been limited in meeting the need for a practical means of capturing and disposing of the particulate emissions from large mobile diesel engines in a reliable manner over prolonged running periods.

In summary, it is well known to sequentially collect, burn up the collected particles, and then repeat the cycle. However, this process results in a high energy penalty due to back pressure build up between regenerations, a high energy penalty in initiating regeneration, cracking and melting of the filter due to extraordinary temperature excursions brought on by intense exotherms during combustion of particles, and eventual plugging of the filter due to metallic compound residues left in the media after many regeneration cycles.

Some attempts have been made to overcome the drawbacks of the periodic regeneration approach by going to continuous regeneration of the filter. In one laboratory trial a filter was provided which remained on stream during constnat regeneration. In this case, the energy penalty was very high, the energy used to regenerate amounting to almost the same amount of energy used to power the engine. It is therefore clearly not practical to try to raise the temperature of the entire engine exhaust gas stream to the ignition temperature of the soot particles on a continuous basis.

It is also known to directly burn soot off of a filter medium. Such procedure is difficult at best. For example, not only must the temperature of the soot and surrounding gas be raised, but also, the filter segment itself must be elevated to soot combustion temperature if a complete regeneration is to be accomplished.

It is an object of this invention to provide a useful exhaust gas regenerable filter that operates in a continuous cleaning mode so that engine back pressures are maintained at consistently low levels throughout operation and do not fluctuate to extremes of high back pressure.

It is a further object of this invention to provide a regenerable exhaust gas filter that continuously burns the collected particulate matter outside the main exhaust gas exit way, in this manner making use of very low energy consuming heaters while avoiding the extremes of temperature which would otherwise result from the sudden burning of large quantities of accumulated particulate matter, as in the case of conventional prior art trap oxidizers.

It is also an object of this invention to provide a regenerable filter which is useful in bringing combustible particles to a heated surface that can be easily maintained at a regenerating temperature with low energy expense while the device is in operation.

It is also an object of this invention to provide a regenerable filter which is useful in retaining a precoating on the filter medium to thereby provide a much higher overall filtering efficiency than might be achieved with a filter that is constantly being stripped bare of built up particles.

It is also an object of this invention to provide a regenerable filter which is useful in essentially eliminating the problem of metallic compound buildup within the filter itself.

It is also an object of this invention to provide a regenerable filter which is useful in greatly enhancing the life expectancy of the filter medium by allowing it to operate essentially free from the temperature extremes brought about by combusting large quantities of builtup particles directly on the filter.

SUMMARY OF THE INVENTION

This invention achieves these and other results by providing a regenerative filter for engine exhaust gas based upon a continuous cleaning and regeneration mode of operation where combustible particles contained in the gas stream are collected on a porous filter suface element made of sintered metal fibers, sintered powder metal, cellular ceramic or the like, and where particles collected on such surface are scraped off so they fall onto a heated plate where they are oxidized.

The heated plate is located far enough from the main gas flow path and the porous filter surface so that only enough fresh exhaust gas circulates into the combustion zone to support soot burning without the need to raise the temperature of the entire exhaust gas stream.

In one embodiment, the collecting filter surface is in the form of a rotating drum the surface of which passes in close proximity to a stationary scraper blade which removes accumulated combustible particle matter from the surface of the filter while preserving a minimum thickness of particles which act as a precoat, thereby retaining the high particle capture efficiency of the combination of filter and initial soot charge.

In another embodiment, the collecting surface is in the form of a fixed position flat, corrugated or pleated fine pore size sheet, or a cellular wall flow multiple element configuration or some other traditional filter shape which is wiped clean periodically while preserving a minimum thickness of particles which act as a precoat. The scraping motion is activated at some prescribed back pressure level or by a timer or other method, particles built up on the surface of the filter being scraped off by one or more moving scraper elements to fall of their own weight onto a heated surface lying below the filter element and outside of the main exhaust gas passageway.

DESCRIPTION OF THE PREFERRED EMBODIMENTS

Figure 1:
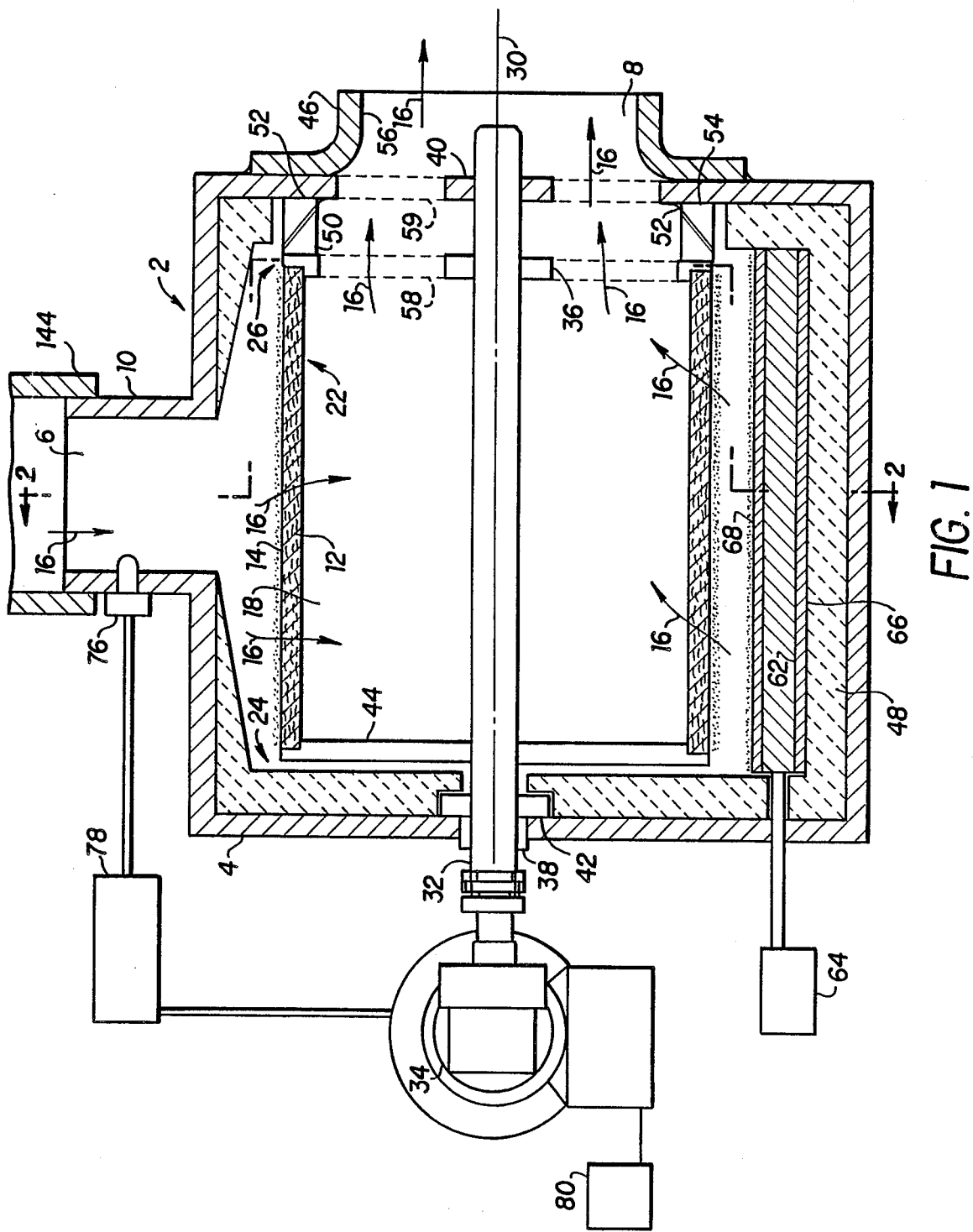
FIG. 1 is an elevational view in cross section of the regenerable filter of the present invention.
Figure 2:
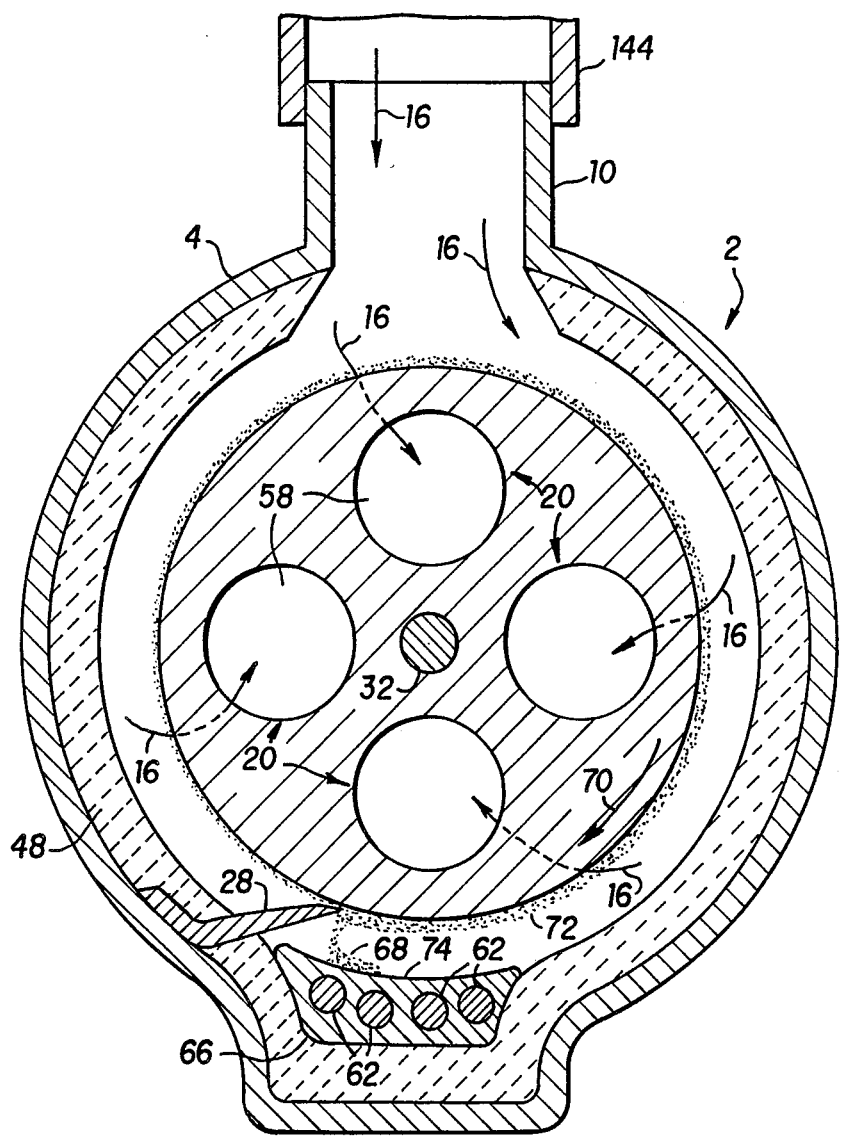
FIG. 2 is a view taken along the line 2—2 of FIG. 1.

The embodiments which are illustrated in the drawings are particularly suited for achieving the objects of this invention. Although not intended to be so limited, the embodiments herein will be described for use with a diesel engine. FIGS. 1 and 2 depict a regenerative filter 2 for exhaust gas streams containing combustible particles wherein the exhaust gas streams pass through a filter medium which is provided to remove the combustible particles from the exhaust gas stream and to cause the particles so removed to build up upon a surface of the filter medium. Regenerative filter 2 comprises a stationary sealed housing 4 having an entry conduit 6 and an exit conduit 8 for passage of the exhaust gas streams into and out of the sealed housing, respectively. The housing 4 may have any convenient shape but must be made from materials such as steel which can withstand the temperature and corrosive gases to which it will be exposed. When used with a diesel engine, the entry conduit 6 connects to the engine exhaust manifold or exhaust pipe 144 along sealing surfaces 10.

At least one filter medium 12 is provided having at least one porous surface 14 and being disposed within the sealed housing between the entry conduit 6 and the exit conduit 8. In this manner, exhaust gas streams can flow in the direction of the arrows designated 16 into the sealed housing at the entry conduit 6, through the porous surface 14, and out of the sealed housing at the exit conduit 8. Filter medium 12 is sealed relative to the exhaust gas streams to prevent passage of such gas streams to exit conduit 8 except through porous surface 14. During flow of the gas stream, the combustible particles in the exhaust gas streams are filtered out and caused to build up upon the porous surface. By way of example and without limitation, the porous surface can be formed from metal elements such as fiber metal or powder metal which is sintered and which provides an average pore size rating in the range of about 10 to 100 micrometers.

The filter medium and porous surface associated therewith can take any desired shape. For example, the filter medium can be in the form of a flat or contoured plate or plates, tubes, cells or other geometric shapes provided the entering exhaust gas streams must pass through the porous surface before passing through the exit conduit.

In one embodiment, the porous surface 14 comprises a hollow member which includes an internal cavity 18 and at least one exhaust conduit 20 which serves to couple the internal cavity 18 with the exit conduit 8. For example, in the embodiment of FIGS. 1 and 2, the hollow member is tubular and includes a cylindrical portion 22 formed by the porous surface 14, a sealed first end 24, and a sealed second end 26. The sealed second end comprises at least one exhaust conduit 20.

Means is also provided within the sealed housing in close proximity to the porous surface 14 for removing the combustible particles from the porous surface while leaving a thin coating of combustible particles, referred to herein as a precoat, on the porous surface. For example, in the embodiment of FIGS. 1 and 2, a stationary elongated scraper 28 is positioned in close proximity to porous surface 14 and extends in the direction of the axis 30 of the cylindrical portion 22 of the hollow tubular member.

Means is also provided within the sealed housing for causing relative movement between the porous surface 14 and the removing means such as scraper 28. In the embodiment of FIGS. 1 and 2, such relative movement is effected by causing the hollow tubular member to rotate about axis 30 relative to the stationary scraper 28. However, relative movement as used herein is intended to be broad enough to include movement of the porous surface only or movement of the removing means only, or movement of both the porous surface and removing means.

Referring to FIGS. 1 and 2, the rotatable filter drum 35 formed by the cylindrical portions 22 including porous surface 14 is mounted on drive shaft 32 by means of solid end plate 44 at first end 24 and open exhaust port end plate 36 at second end 26. Drive shaft 32 is connected to a motor 34 through a flexible shaft coupling in a known manner, and rotates in bearings 38 and 40 causing rotation of the hollow tubular member and porous surface 14 forming a part thereof. The drive shaft 32 is sealed at the chamber outlet by seal 42 to keep exhaust gases from escaping. The entire chamber is sealed to prevent escape of gas except through an exhause discharge pipe 46, and is lined with ceramic or other type high temperature insulation material 48 to reduce heat loss. The rotatable drum is sealed from the entering exhaust gas stream except through the porous surface 14. Exhaust port end plate 36 is connected to the rotatable half 50 of a ring seal, the fixed half 52 of the ring seal being attached to the chamber wall at 54 to prevent unfiltered exhaust gas flow into exhaust port 56. After passing through the porous surface 14, the purified gas escapes through openings 58 in exhaust port end plate 36, corresponding openings 59 in sealed housing 4, and exit conduit 8 in discharge pipe 46, as indicated by the arrows 16.

Regenerable filter 2 also includes means disposed within the sealed housing and in close proximity to the porous surface and out of the flow path of the exhaust gas stream for burning the combustible particles as such particles are removed from the porous surface by removing means such as the scraper 28. In the preferred embodiment the burning means will include a surface area positioned relative to the porous surface so that as the combustible particles are removed from the porous surface such particles engage the surface area which is in close proximity to the porous surface but is out of the flow path of the exhaust gas stream. In the embodiment of FIGS. 1 and 2, the surface area is positioned below the porous surface so that the removed particles will fall as a result of gravity upon the surface area as described herein.

In the preferred embodiment, the burning means includes electric cartridge heater elements 62, powered by external electric source 64, and being mounted in heater block 66 located below and spaced from the rotating filter drum. The heater block 66 receives particle accumulations 68 and effects oxidation. As will be apparent from FIG. 2, during rotation of the filter drum slowly in the direction indicated by arrow 70, particle accumulations 72 which extend outwardly from porous surface 14 are stripped off the porous surface by scraper 28 while a thin precoat layer is left intact on the porous surface to enhance filtration during the next rotation of the filter drum. With routine operation, heater block 66 is maintained at sufficient temperature to bring about oxidation of the deposited particles soon after the particles reach the surface area 74 of the heater block. To this end, the electric cartridge heater elements 62 are selected so that such elements will heat the surface area 74 to at least the ignition temperature of the combustible particles. If desired, the surface area 74 can be coated with a catalyst of the type which will reduce the temperature of the surface area required to burn the combustible particles. By way of example and without limitations, such a catalyst can be a proprietary precious metal alloy of the type made by Englehard Mineral Corporation of Edison, New Jersey, specifically for lowering the ignition temperature of diesel particulates.

Relative movement between the filter medium and particle removing means can be continuous or intermittent. It might be desirable to speed up, slow down, or stop movement altogether. For example, in some cases it may be found advantageous to utilize a pressure sensor 76, located in the wall of sealed housing 4 at some point before the exhaust gas passes through filter medium 12. The pressure signal could be utilized to regulate the frequency of cleaning, in this case by adjustment of the motor 34 controlling the speed of the filter drum through the use fo a pressure regulated motor speed controller 78. Through this means, the filter drum rotation may be activated, deactivated, speeded up under the most severe operating conditions which would cause high pressures, and slowed down during periods of low back pressure operation. Alternatively, a timer 80 can be provided to periodically active/deactivate the motor 34.

The present invention is not limited to any particular means for effecting relative movement between the filter medium, including porous surface 14, and the removing means such as the scraper 28. For example, in the embodiment described herein, such relative movement is effected by means of the motor 34 which causes rotation of the filter drum. Alternate means can be used to effect such movement.

Figure 4:
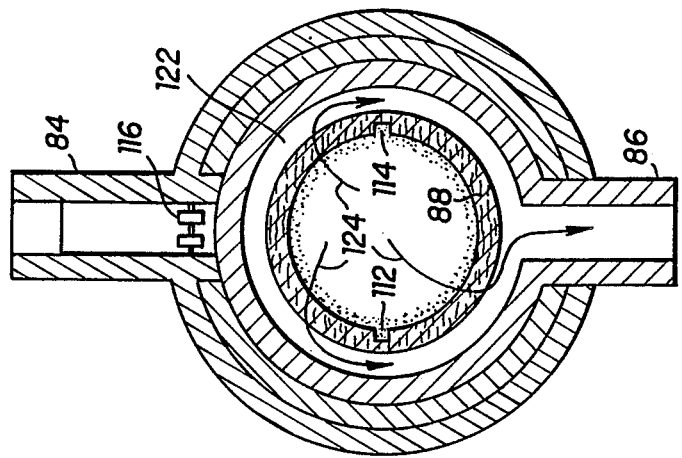
Figure 3:
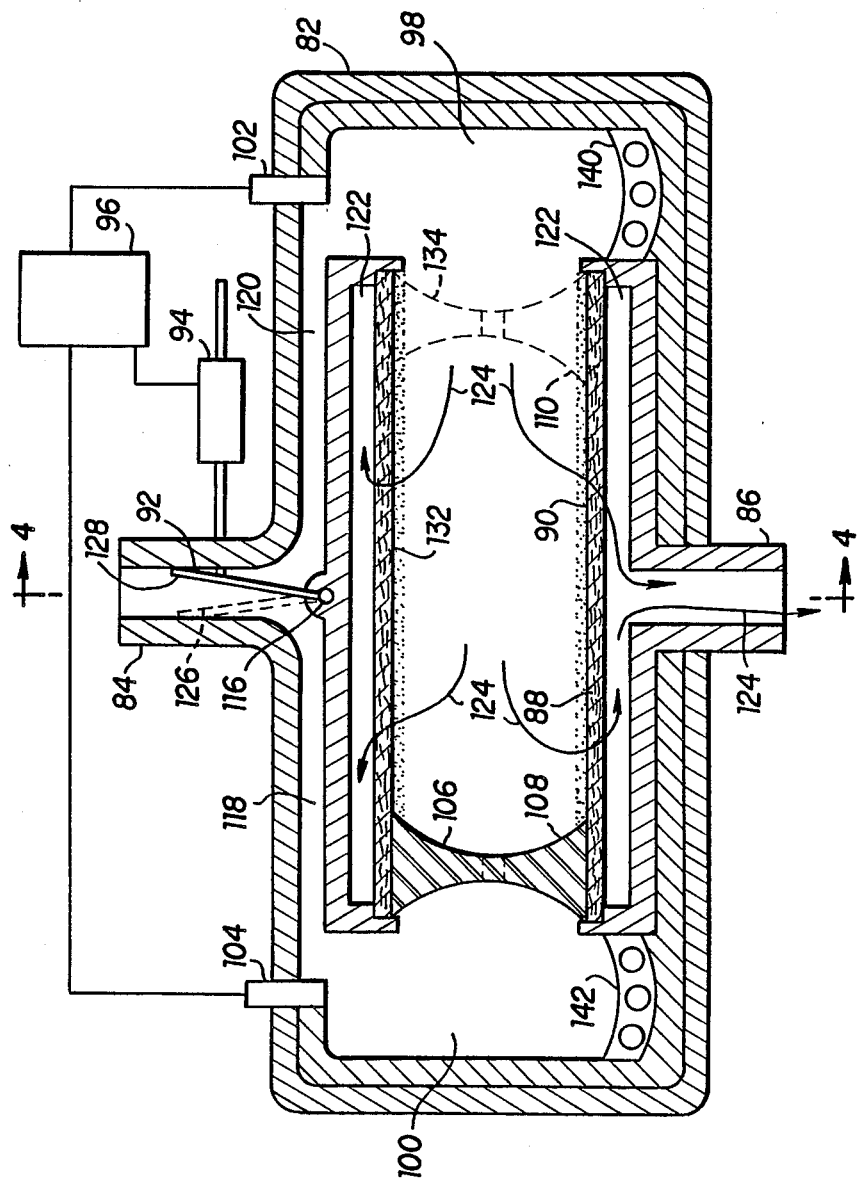
FIG. 3 is an elevational view in cross section of another version of the regenerable filter of the present invention; and, FIG. 4 is a view taken along line 4—4 of FIG. 3.

FIGS. 3 and 4 depict a regenerable filter for exhaust gas containing combustible particles wherein the filter medium remains in fixed position and a scraper element is caused to periodically move across the particle collection surface of the filter to scrape away particles accumulated thereon for transference to heated plates located outside of the main exhaust gas stream for oxidation. During such scraping, however, a precoat of the type discussed regarding FIGS. 1 and 2 remains on the filter. In this example, the movement of the scraper element is effected by utilizing the exhaust back pressure, although other means of effected relative movement can be used.

The regenerative filter of FIGS. 3 and 4 comprises a stationary sealed housing 82 having an entry conduit 84 and an exit conduit 86 for the passage of the exhaust gas streams into and out of the sealed housing, respectively. In this embodiment of the invention, at least one filter medium 88 having at least one porous surface 90 is disposed within the sealed housing between the entry conduit 84 and the exit conduit 86 so that all of the entering gas must pass through the filter element 88 before reaching exit conduit 86. The entry conduit 84 is provided with a flapper valve 92 actuated by solenoid 94 in response to signals from pressure controller 96 which monitors the gas pressure within inlet chambers 98 and 100 through pressure transducers 102 and 104, respectively.

Moveable scraper 106 forms a substantially entirely gas tight seal with filter surface 90 and slides from end 108 to end 110 of the filter in support alignment grooves 112 and 114, sliding from a position adjacent to inlet chamber 100 and forming a temporary wall thereof to a position adjacent to inlet chamber 98 and forming a temporary wall thereof, being driven by exhaust gas back pressure which builds up in chamber 98 or 100, depending upon the position of flapper valve 92.

Exhaust gas entering the filter housing through inlet 84, is diverted by flapper valve 92, which pivots from side to side on hinge 116, into inlet conduit 118 leading to inlet chamber 100, or is diverted into inlet conduit 120 leading to inlet chamber 98. From either inlet chamber, exhaust gas enters the filter 88 through porous surface 90, flowing into exhaust exit chamber 122, from which it passes out through exit conduit 86, as shown by the arrows 124.

The device is shown in an arrested state of motion such as would occur for a brief instant immediately after the flapper valve 92 had switched from position 126 indicated by the dash lines to position 128 shown in solid lines. Such a change in flapper valve position would come about when the pressure in chamber 98, as detected by pressure transducer 102, exceeded a prescribed operating limit such that pressure controller 96 would actuate solenoid 94 to reposition the flapper valve, thereby diverting the incoming exhaust gas from inlet conduit 120 leading to inlet chamber 98 into inlet conduit 118 leading to inlet chamber 100. This back pressure build up activating the controller would have been the result of particles 132 building up on filter surface 90 while the scraper 106 was adjacent to inlet chamber 100 in the position 108 indicated by the solid lines.

Immediately upon flapper valve repositioning, exhaust gas back pressure in chamber 100 would rise, causing scraper 106 to slide across the collecting surface of filter 88, from starting position 108 to ending position 110, thereby dislodging all but a thin precoat of the particles residing on the collecting surface 90 and causing them to fall by gravity onto heater block 140, where they would be raised to their ignition temperature while outside the exhaust gas stream.

With the sliding scraper positioned adjacent to inlet chamber 98 as indicated by the dash lines 134, particles will again build up on filter surface 90, in this case, with back pressure rising inside inlet chamber 100 until the same prescribed maximum back pressure level is exceeded, whereupon solenoid 94 would return the flapper valve to position 126, causing scraper 106 to retrace its path and once again strip away the accumulated particle matter from filter surface 90, this time depositing the particles on heater block 142 inside inlet chamber 100, which would then be isolated from the incoming exhaust gas stream, and the cycle would begin again.

When the flapper valve 92 switches position, the preexisting high back pressure level is immediately transferred from one inlet chamber to the other, with little or no loss of back pressure until such pressure is relieved by the removal of particles accomplished through the repositioning of the scraper 106. Immediately upon repositioning of the scraper, incoming exhaust gas is diverted away from the heater block which received the fresh change of particle matter so that in effect, this heater block and its surrounding inlet chamber is outside the exhaust gas stream and can operate like an oven, isolated from the cooling effects of any fresh exhaust gas during the combustion step.

In like manner, multiple filter tubes may be used side by side, or a thin wall honeycomb monolith type of filter may be used. A multiplicity of sliding scraper elements may be arranged in side by side array to provide one scraper element for each of the exhaust entry passages. Scrapers may be driven by exhaust back pressure, by motors, or by any other means available.

In the embodiments of FIGS. 1 to 4, it is desired to maintain a precoat on the filter to insure high cleaning efficiency. However, it is likely that over long term operation, the precoat will densify and cause increasing back pressure. For this reason, provision can be made for occasional regeneration of the filter itself. In some instances, it will be found advantageous to place the filter medium somewhere in the immediate vicinity of the engine to take advantage of the high exhaust temperatures that occasionally occur during routine engine operation so as to minimize the need for additional heating capacity to periodically clean down the filter element. For example, the regenerable filter 2 might be coupled directly to an exhaust manifold 144 of a vehicle.

Alternatively, after long intervals of operation, soot can be scraped from the filter and accumulated on the heater surface until a sufficient quantity has been amassed such that upon ignition, enough heat due to the heater and exothermic reaction is generated as to completely regenerate the filter. Such a step may be taken when, for example, a truck is brought to a stop and the engine is idled, providing just enough flow of fresh exhaust gas to insure adequate oxygen for complete regeneration of the filter, but not so much exhaust gas as to bring about excessive cooling down of the filter compartment.

As another alternative, when back pressure exceeds a predetermined level, or periodically, the filter precoat can be oxidized and the filter regenerated after the engine is turned off by using the filter compartment as an oven. Such will be the case when, after shutting off the engine, the heater is left on for several minutes. Without the cooling effect of entering exhaust gas, the heater will raise the temperature of the filter and the exhaust gas residing in the filter compartment. Because the filter has been constantly stripped of all but a thin precoat prior to this filter regeneration step, only a small mount of accumulated soot will be present on the filter prior to regeneration. For this reason, sufficient oxygen should be present in the filter compartment to permit complete oxidation of the soot precoat on the filter. In the event that more oxygen is in fact needed for complete regeneration, a small amount of air may be admitted to the filter compartment during this filter regeneration step. When filter regeneration is complete, or after a predetermined time interval, the heater would be turned off and the regenerative exhaust gas cleaning system would be ready for the next use cycle.

One embodiment of the invention was constructed according to FIGS. 1 and 2 and evaluated at the Frederick O. Hess Engineering Research Laboratory of the Mechanical Engineering Department at Drexel University, Philadelphia, Pennsylvania. The unit was installed in the exhaust line of an existing ASTM-CFR direct injection single cylinder diesel cetane rating test engine manufactured by Waukesha Motor Company. This engine has a compression ratio of 19.0:1, and a cylinder bore of 3.25 inches.

The filter included a thin wall flow type cylindrical filter element 4 inches long by 4 inches in diameter keyed through end plates to a rotatable shaft driven by a variable speed motor which could be operated over the range of from 0.16 to 5.0 rpm. One end of the filter tube was sealed with a solid end plate while the other end utilized a vented end plate which led to the exit port of the filter housing. The rotatable drum was so arranged that, under optimum conditions, essentially all of the entering exhaust gas had to pass through the filter surface before reaching the discharge pipe. A rotatable seal was disposed alongside the turning filter drum in the manner already described herein.

A compact 900 watt high energy density heater block approximately 3 inches long by 1 inch thick by 2 inches wide was placed about ½ inch below the filter drum. The block contained three heating cartridges, each rated 300 watts.

A scraper blade was located in fixed position approximately 1/16 inch from the surface of the rotating drum so as to cause all except a thin precoat of particles deposited upon the surface of the filter to be dislodged and fall upon the heater block.

The engine was run at 1150 rpm, 9.25 lbs. of load, and 13 degrees before top dead center injection angle. Exhaust gas flow rate was 11 CFM at 370° F. approximate gas temperature at the filter housing location. The soot generation rate was estimated to be 120 grams/hour. Numerous trials were run with this filter, employing a variety of filter elements and filter rotation speeds.

By way of example, the filter was equipped with a 0.062 inch thick porous stainless steel sintered powder metal filter element having a nominal average particle capture rating of 20 micrometers, made by Mott Metallurgical Corporation, Farmington, CT. With the filter drum motor operating a 0.16 rpm, the heater block temperature was brought up to 1100° F., and the engine exhaust was fed through the filter. At the outset of this test run, exhaust gas back pressure in the filter housing was approximately 9 inches of water. After the first half hour of operation, pressure drop had increased to 10 inches of water and particle cleaning efficiency was found to be 80%. After two hours of run time, filter back pressure had increased to 13 inches of water and cleaning efficiency reached 83%. Throughout the run, the heater block was able to maintain the set temperature despite the flow of exhaust gas through the filter housing, because the heater was not located in the direct path of the exhaust gas stream.

These results are reported by way of example and by no means represent the limits of performance that can be expected with the device when it is optimized and put into actual service.

The regenerable filter described herein allows for the removal of combustible particles from a gas stream, their build up upon a filter medium, their removal from the filter medium in such a manner as to leave a precoat deposit on the filter medium, and the burning of such removed particles in an area remote from the exhaust gas stream of the regenerable filter. Since combustion of the particles occurs outside of the main gas stream, it is not necessary to raise the temperature of all the exhaust gas to the ignition temperature of the collected carbon. Thus, low energy heaters will suffice to raise the temperature of the small amount of gas that circulates in the vicinity of the deposited particles, providing enough oxygen to maintain combustion without causing excessive energy demands upon the heater system. In those instances where a thin wall porous filter medium is used, particularly in the range of from 10 to 100 micrometer average pore size, and from 0.025 to 0.250 inch thickness, low efficiency and low back pressure will likely occur initially. However, when this type of filter is placed in operation and builds up an initial charge of particulate matter both within and on top of the filter surface, cleaning efficiency will increase dramatically. By adjusting the scraper spacing relative to the filter medium, particle build can be limited to just slightly more than the thickness of the filter medium itself, the back pressure penalty paid for the increased efficiency being minimal. Unlike ordinary trap oxidizers, where back pressure fluctuates from the regenerated cleaned down state to very high back-pressure just prior to regeneration, (with an opposite pattern of low to high efficiency), the regenerable filter of the present invention operates normally with a stable precoat which remains intact on the filter medium during routine operations, operating at low back pressure and low power drain upon the engine with high filtering efficiency. Only periodically, when the normal level of filter back pressure is noted to have increased beyond some prescribed operating level, will the filter medium itself be cleaned down by regeneration. After the regeneration step, it is expected that, owing to the openness of the filter medium without particle residue, trace metallic compounds present in the filter medium will for the most part become reentrained in the exit gas flow immediately following regeneration. By carrying out combustion of the carbon particles away from the filter medium, the filter medium will not be subject to repeated severe thermal stress except on those occasions when it is found necessary to purify the filter medium by removal of its precoat.

It is likely that over extended periods of time, the filter medium will become densely packed with fine particles. Such accumulations occurring within and on the filter surface might eventually plug the filter medium, particularly since the regeneration step is most routinely carried out remote from the main gas exit path and away form the filter medium surface itself. For this reason, it is advantageous to place the burner just outside of the main gas flow path, as described herein, but close enough to the filter medium such that the filter itself may be regenerated when required. This can be accomplished, for example, by operating the burner at maximum output when the diesel engine is idled or even turned off. The burner can raise the trap chamber to the particle ignition temperature provided there is only a moderate incoming gas flow. Bearing in mind that only a thin residue of particles will cover the filter medium, any exotherm caused by regeneration will not result in a damaging temperature excursion but will only serve to insure complete combustion of the residue on the filter medium.

Because the regenerable filter is only infrequently subjected to regeneration, it will not be thermally stressed as frequently as prior art trap oxidizers. Furthermore, because the amount of accumulation on the filter medium is limited to the thin precoat needed to achieve high efficiency, exotherms during regeneration will not cause the type of severe temperature excursions incurred with normal trap oxidizers. Therefore, filter life may be extended without the occurrence of melting or cracking due to thermal stress, less expensive or exotic materials may be used for the filter, and the device will enjoy increased life expectancy compared to filters used heretofore.

By placing the burner element out of the main exhaust gas exit path, less heat energy is conducted away form the point where particle ignition and disposal takes place. With the reduced need for heating capacity, it will not be essential that the trap oxidizer be placed in such close proximity to the hot source of emission. With this restriction eliminated, it is possible to retrofit operating motor vehicles such as diesel busses and trucks outside the limited space of their engine compartments. This added flexibility may also be an advantage for new mobile units.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A regenerable filter for exhaust gas streams containing combustible particles wherein said exhaust gas streams pass through a filter medium which is provided to remove said combustible particles from said exhaust gas streams and to cause said combustible particles so removed to build up upon a surface of said filter medium, comprising:
   a sealed housing having a entry conduit and an exit conduit for passage of said exhaust gas streams into and out of said sealed housing, respectively;
   at least one filter medium having at least one porous surface and being disposed within said sealed housing between said entry conduit and said exit conduit so that said exhaust gas streams can flow into said sealed housing at said entry conduit, through said at least one porous surface and out of said sealed housing at said exit conduit, said at least one filter medium being sealed relative to said exhaust gas streams to prevent passage of said exhaust gas streams to said exit conduit except through said at least one porous surface, combustible particles building up upon said at least one porous surface as said exhaust gas streams flow through said at least one porous surface;
   means disposed within said sealed housing in close proximity to said at least one porous surface for removing said combustible particles from said at least one porous surface while leaving a thin precoat of said combustible particles on said at least one porous surface; and,
   means disposed within said sealed housing and in close proximity to said at least one porous surface and out of the flow path of said exhaust gas stream for burning said combustible particles as said combustible particles are removed from said at least one porous surface by said removing means.

2. The regenerable filter of claim 1 wherein said burning means includes a surface area positioned relative to said at least one porous surface so that as said combustible particles are removed from said at least one porous surface said combustible particles so removed engage said surface area.

3. The regenerable filter of claim 2 further including means for heating said surface area to at least the ignition temperature of said combustible particles.

4. The regenerable filter of claim 3 further including means within said sealed housing for causing relative movement between said at least one porous surface and said removing means.

5. The regenerable filter of claim 4 wherein said at least one porous surface comprises a hollow member, said hollow member including an internal cavity and at least one exhaust conduit coupling said internal cavity with said exit conduit.

6. The regenerable filter of claim 5 wherein said hollow member is tubular and includes a cylindrical portion formed by said at least one porous surface, a sealed first end, and a sealed second end, said sealed second end comprising said at least one exhaust conduit, said hollow member being rotatable about the axis of said cylindrical portion.

7. The regenerable filter of claim 6 wherein said removing means comprises at least one stationary elongated scraper extending in the direction of said axis.

8. The regenerable filter of claim 4 wherein said surface area is coated with a catalyst of the type which will reduce the temperature of said heating surface required to burn said combustible particles.

9. The regenerable filter of claim 6 wherein said surface area is coated with a catalyst of the type which will reduce the temperature of said heating surface required to burn said combustible particles.

10. The regenerable filter of claim 4 wherein said at least one porous surface comprises metal elements sintered to provide an average pore size rating in the range of about 10 to 100 micrometers.

11. The regenerable filter of claim 6 wherein said at least one porous surface comprises metal elements sintered to provide an average pore size rating in the range of about 10 to 100 micrometers.

12. The regenerable filter of claim 4 wherein said means for causing relative movement between said removing means and said at least one porous surface includes means for causing such relative movement by back pressure forces created in said sealed housing during operation of said regenerable filter.

13. The regenerable filter of claim 1 wherein said regenerable filter is coupled to and for use with a vehicle having an exhaust manifold and wherein said regenerable filter is affixed to said vehicle in close proximity to said exhaust manifold.

14. The regenerable filter of claim 4 further including means for intermittently effecting said relative movement.

15. The regenerable filter of claim 14 wherein said means for intermittently effecting said relative movement comprises a back pressure sensor positioned within said sealed housing for effecting said relative movement in response to a predetermined level of back pressure within said sealed housing.

16. The regenerable filter of claim 14 wherein said means for intermittently effecting said relative movement comprises a timer.

* * * * *